United States Patent [19]

Schluderberg

[11] 4,324,618
[45] Apr. 13, 1982

[54] FUEL ELEMENT ASSEMBLY

[75] Inventor: Donald C. Schluderberg, Lynchburg, Va.

[73] Assignee: The Babcock & Wilcox Company, New Orleans, La.

[21] Appl. No.: 47,591

[22] Filed: Jun. 8, 1979

[51] Int. Cl.³ .............................................. G21C 3/08
[52] U.S. Cl. .................................... 376/434; 376/454
[58] Field of Search ............................ 176/76, 78, 81

[56] References Cited

U.S. PATENT DOCUMENTS

| | | | |
|---|---|---|---|
| 3,096,264 | 7/1963 | Bauer | 176/81 |
| 3,105,035 | 9/1963 | Weems | 176/81 |
| 3,361,640 | 1/1968 | Hassig | 176/81 |

Primary Examiner—Donald P. Walsh
Attorney, Agent, or Firm—Robert J. Edwards; Robert H. Kelly

[57] ABSTRACT

A nuclear fuel assembly of the type having a plurality of nuclear fuel elements disposed in parallel, and forming a plurality of longitudinal flow channels, in a closely packed array is disclosed. Axially spaced longitudinal fins formed integrally on at least some of the fuel elements, at an angle with the fuel element axis, serve to divert coolant flowing longitudinally past the fuel elements between adjacent flow channels to promote mixing and even heating of the coolant. Each fin traverses the clearance between adjacent fuel elements, tangentially contacts the body of an adjacent fuel element, and is fixedly connected thereto. Sets of the axially spaced fins are fixedly connected to adjacent fuel elements, as described, in substantially the same transverse plane relative to the longitudinal axis of the fuel assembly. At the leading end of the fins, the relative flow rate diverted from adjacent flow channels alternates; and at the trailing end of the fins, the relative flow rate conveyed to adjacent flow channels also alternates; moreover, in a given flow channel the number of flow streams diverted and converged, at the leading and trailing fin edges, also alternates.

4 Claims, 19 Drawing Figures

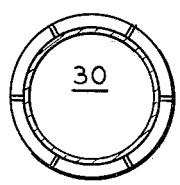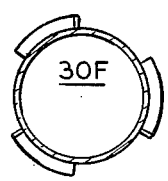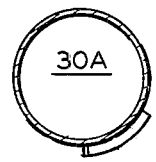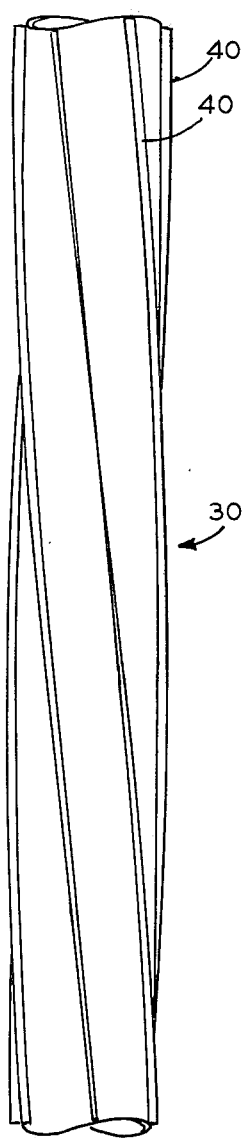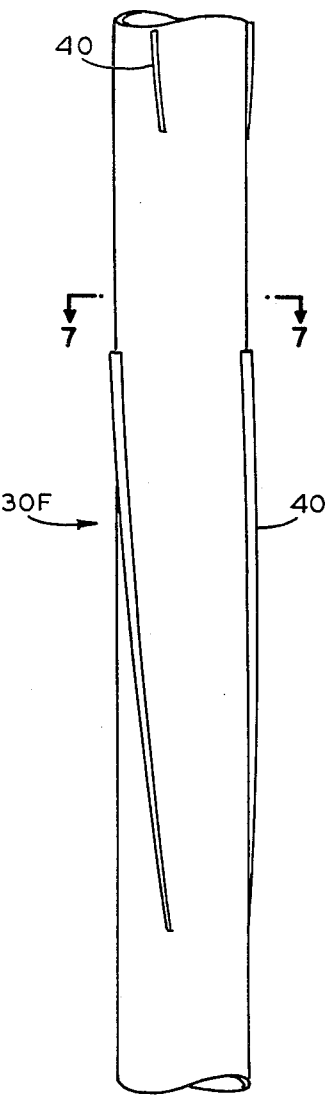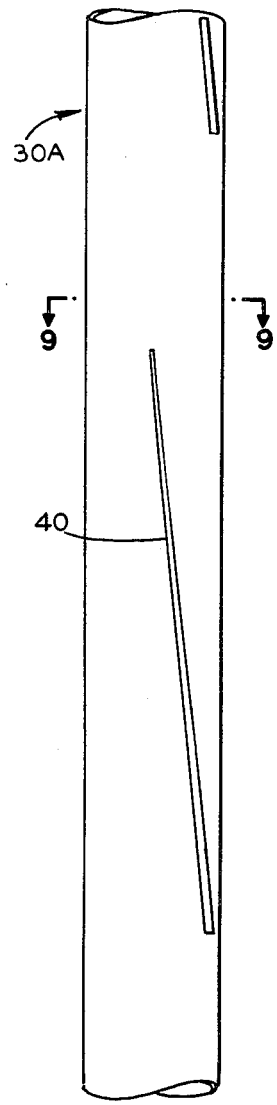

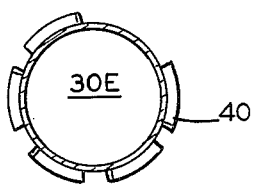
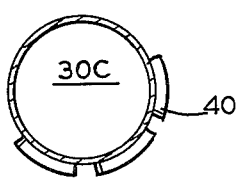
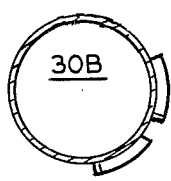
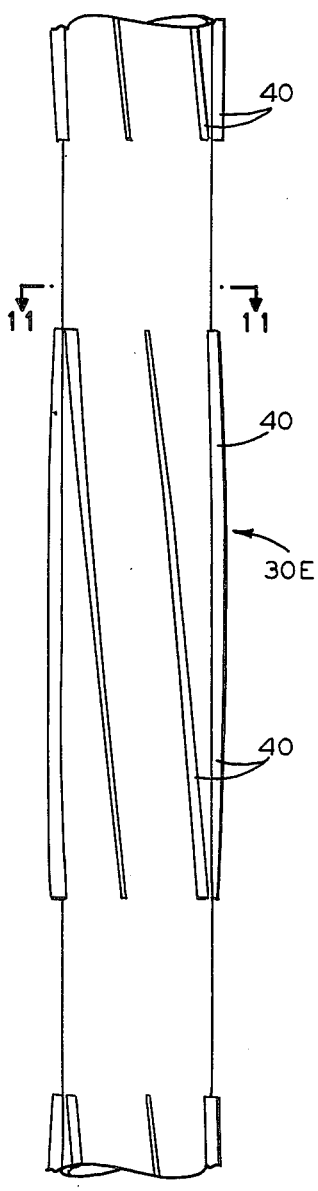
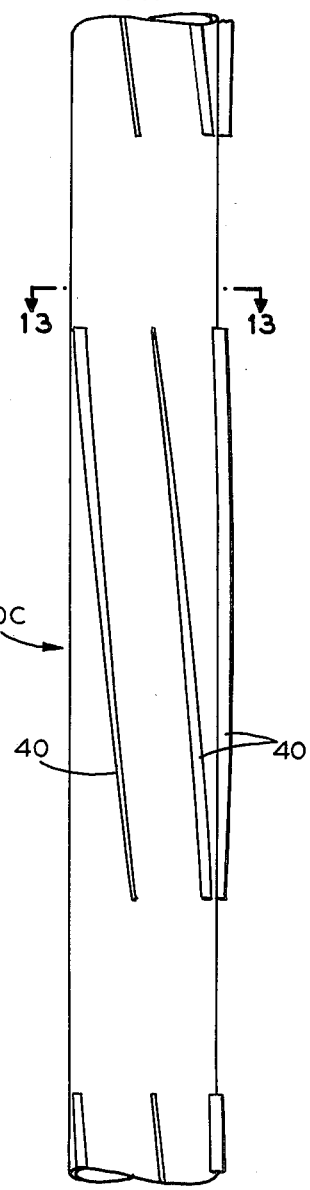
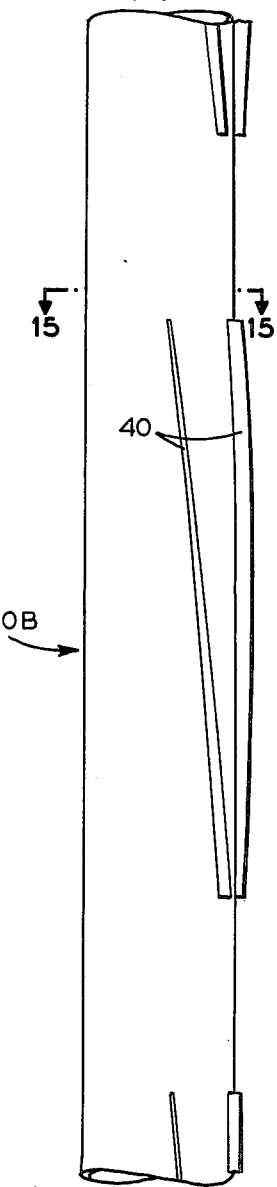

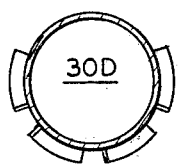
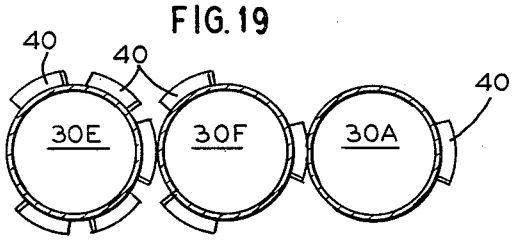
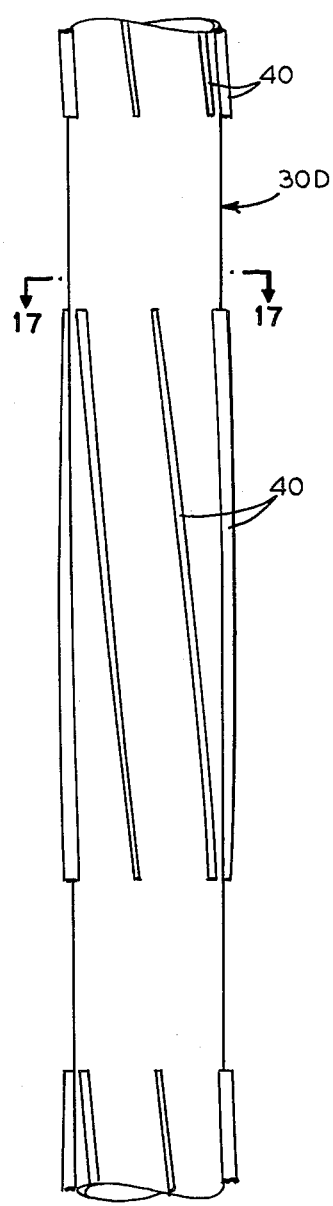
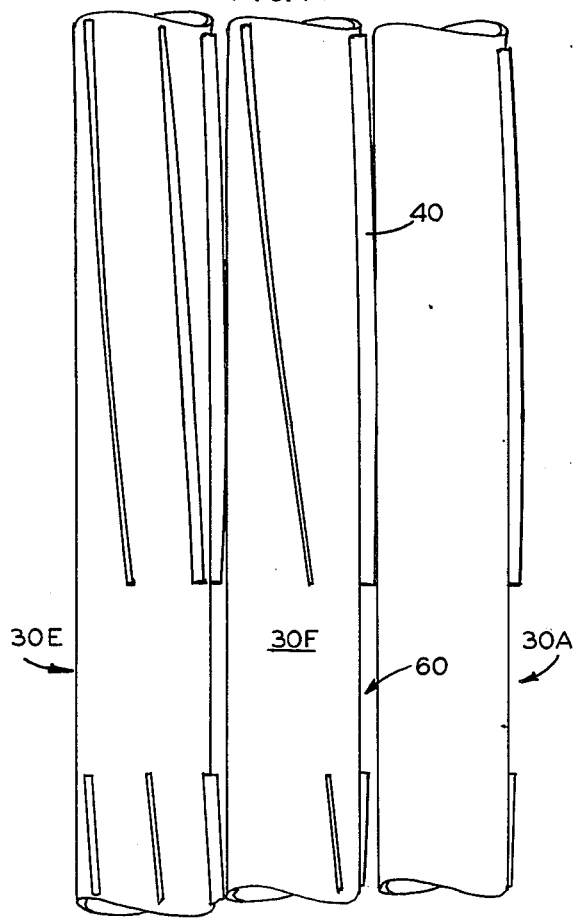

FUEL ELEMENT ASSEMBLY

This invention relates to fuel element assemblies for nuclear reactors and, more particularly, to fuel element assemblies for "tight lattice" water-cooled nuclear converter reactors in which fission is induced predominantly by neutrons with energy levels beyond the range of the thermal neutron spectrum.

The possibility of a pressurized heavy water nuclear reactor having an epithermal to intermediate neutron spectrum characterized by an improved breeding ratio in comparison to similar classes of previously existing reactors is disclosed in U.S. Pat. No. 3,859,165. Similar advantages have been ascribed to a uranium-plutonium fuel cycle, for a light water reactor utilizing a close-packed lattice with water volume fractions in the range of 0.2 to 0.3, in the Transactions of the American Nuclear Society, Vol. 5 (1978), pp. 508–509. The neutron spectra for the latter lattices are said to be typical of those in a fast breeder with the exception of a larger tail extending into the high resolved resonance region (approximately 400 eV). As a result, it is clear that it may be possible to impart epithermal to fast reactor characteristics to a pressurized water reactor core having a "tight lattice", so as to achieve conversion ratios exceeding 0.8. A "tight lattice" is defined as having an active core water volume fraction ranging from 0.2 to 0.3 or fuel to water volume ratios in the range of 2 to 3.2. In comparison, conversion ratios of 0.5 would be expected in plutonium recycle designs using the fuel to water volume ratios of typical current operating pressurized water reactors. Conversion ratio is the ratio of the number of atoms of new fissionable material produced in a converter reactor to the original number of fissionable atoms consumed. As used in this specification, a converter reactor is a reactor that produces a fissionable material different from the consumed fuel.

A pressurized water reactor in which fission is induced in a tight lattice by non-thermal neutrons offers the prospect of an efficient conversion of uranium-238 into fissile plutonium-239 utilizing the extensive pressurized water technology presently existing in the nuclear power field. Moreover, a tight lattice fuel assembly core may be advantageously adaptable within conventional pressurized water reactors.

Typical pressurized-water reactor core designs involve the regular distribution of fuel element assemblies having cylindrical fuel elements, known as fuel rods, throughout the core. The heat generating fuel rods are cooled by the flow of pressurized water through adjacent parallel channels which traverse the reactor core. In a pressurized-water converter reactor, having a tight lattice, the water to fuel volume ratio must be minimized to increase the conversion ratio which is dependent upon the spacing of the fuel rods and the enrichment of the fuel. Utilization of a triangular lattice of fuel rods in a fuel element assembly, hexagonal in transverse cross-section, is known (see generally, Annals of Nuclear Energy, Vol. 2, pp. 801–807, 1975) to provide the largest spacing between fuel rods for a given water to fuel volume ratio. In addition, it is important to accommodate and minimize temperature variations within the core, particularly in areas of minimum fuel rod surface to surface spacing, so as to achieve a uniform temperature distribution. Accordingly, it has been suggested that the fuel rods have helical ribs, or be wire wrapped to maintain the spacing between the rods and to promote cross flow from one channel to the next. Although various finned and wire-wrapped rod arrangements have been disclosed in the thermal reactor art or non-water cooled reactor art or both, the different thermal-hydraulic and nuclear considerations relating to tight lattice or design of a pressurized water converter are significant and preclude direct usage thereof. Ararangements using finned and wire-wrapped designs, moreover, may be constrained by core coolant pressure drop limitations. Furthermore, the utilization of the same device to both space the fuel rods and divert coolant is known to limit coolant flow patterns. Hence, a need exists for innovative fuel element assemblies for tight-lattice converter reactor applications.

SUMMARY OF THE INVENTION

In accordance with the invention, there is a tight lattice fuel element assembly for a nuclear reactor in which a multiplicity of cylindrical fuel rods are arranged parallel to each other in a spaced array having an equilateral-triangular pattern. External longitudinal fins serially located at spaced intervals along the length of each fuel rod, curve about a portion of the fuel rod at a constant angle, and tangentially contact the surface of an adjacent fuel rod thereby effecting a mutual six-point lateral support. It is a further feature of the invention that the fins are fixed to the adjacent fuel elements at the points of tangential contact in substantially the same lateral plane such that the fuel elements and fins substantially comprise a single unit within the fuel assembly.

The fins induce coolant cross-flow between adjacent coolant flow channels and, in an illustrated embodiment, establish an alternating pattern of flow divergence and convergence within a flow channel at the leading and trailing edge of each set of axially spaced fins within the channel. The relative flow rate conveyed or diverted with respect to adjacent flow channels in the fuel element assembly's transverse cross-section alternates; moreover, in a given flow channel the number of flow streams diverted or conveyed, at the trailing and leading end of a given series of fins, also alternates.

It is a further feature of the invention that the structure results in a tight lattice arrangement suitable for fuel element assembly for a water-cooled nuclear converter reactor, in which fission is induced predominantly beyond the range of the thermal neutron spectrum, having a conversion ratio equal to or exceeding 0.8.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

FIG. 4 is a side elevation view of a fuel element with six fins formed integrally with the fuel element cladding;

FIG. 5 is a view of the fuel element of FIG. 4 taken along lines 5—5;

FIG. 6 is a side elevation view of a fuel element containing three circumferentially spaced integral longitudinal fins;

FIG. 7 is a view of the fuel element of FIG. 6 taken along lines 7—7;

FIG. 8 is a side elevation view of a fuel element having single axially spaced longitudinal fins;

FIG. 9 is a view of the fuel element of FIG. 8 taken along lines 9—9;

FIG. 10 is a side elevation view of a fuel element having series of five integral circumferentially spaced longitudinal fins;

FIG. 11 is a view of the fuel element of FIG. 9 taken along lines 11—11;

FIG. 12 is a side elevation view of a fuel element containing another arrangement of axially spaced series of three circumferentially spaced integral longitudinal fins;

FIG. 13 is a view of the fuel element of FIG. 12 taken along lines 13—13;

FIG. 14 is a side elevation view of a fuel element having two circumferentially spaced integral longitudinal fins at axially spaced intervals;

FIG. 15 is a view of the fuel element of FIG. 14 taken along lines 15—15;

FIG. 16 is a side elevation view of a fuel element having four circumferentially spaced integral longitudinal fins at axially spaced intervals;

FIG. 17 is an end view of the fuel element of FIG. 16;

FIG. 18 is an elevation view of a number of fuel elements arranged in accordance with the features of the invention; and FIG. 19 is an end view of FIG. 18.

DETAILED DESCRIPTION

Figure 1:
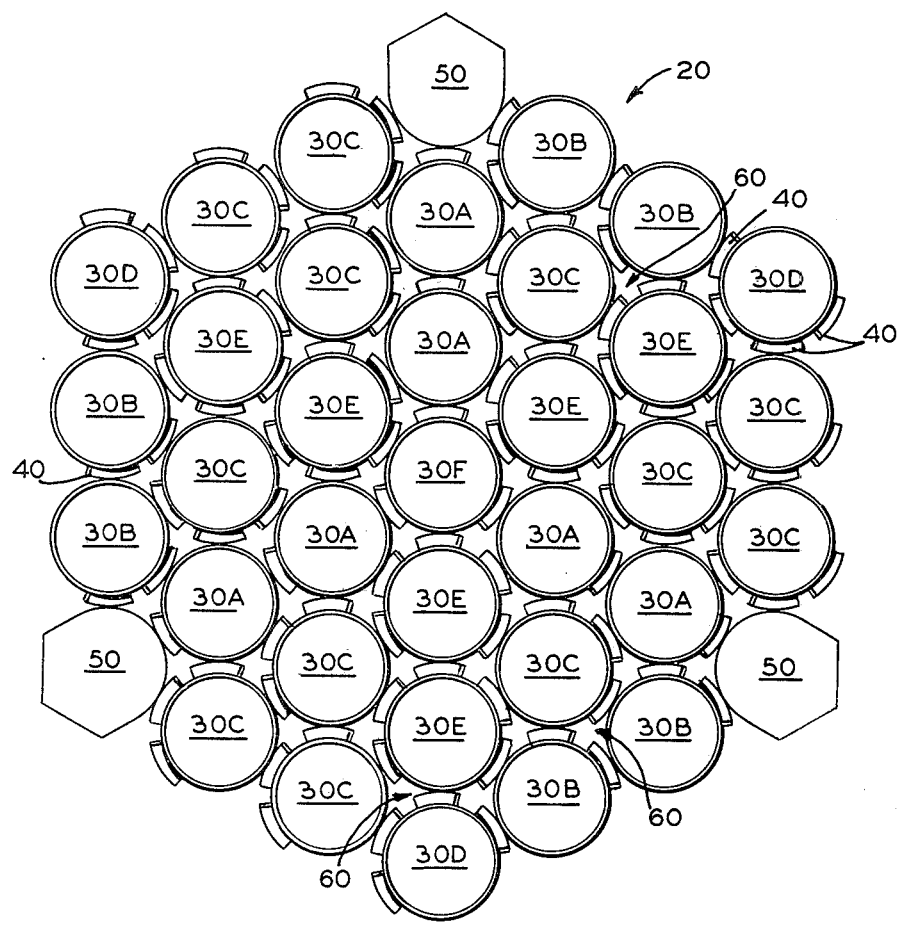
FIG. 1 is a planar cross-section of a fuel assembly made in accordance with a preferred embodiment of the invention.

FIG. 1 illustrates a preferred embodiment of a canless, tight lattice fuel element assembly 20 having a hexagonal cross-section. The fuel element assembly 20 includes a multiplicity of parallel, cylindrical fuel elements 30, known as fuel rods, with external longitudinal fins 40 and assembly spacer means 50 arrayed in a fixed triangular pattern. The fuel element fins 40 are formed integrally with a cylindrical cladding which surrounds a nuclear fuel consisting essentially of a mixture of fertile and fissile materials. Typically, the fuel elements would contain a fertile material such as U-238 or Th-232 mixed with a fuel material such as U-235, Pu-239 or U-233 which is capable of fissioning under the influence of fast neutrons. Parallel longitudinal coolant flow channels 60 disposed between adjacent fuel rods 30 traverse the fuel assembly 20. A cooling fluid, either light or heavy water, flows through channels generally parallel to the fuel rods 30.

Series of one to five of the longitudinal fins 40 angularly traverse equal lengths of each fuel rod 30 at axially spaced intervals. The fins 40 in each series of fins curve about the external cylindrical surface of a fuel rod 30 over an equal circumferential length of at least a portion of the cladding. Adjacent fins in a series are separated by an equal circumferential spacing. All of the fins traverse the fuel rods 30 at an equal and constant angle with respect to the longitudinal axis of the fuel element assembly 20. The height of each fin 40 coincides with the dimension of the minimum clearance between two adjacent fuel rods 30. A point on the periphery of each fin 40 tangentially contacts the cylindrical external surface of the cladding of an adjacent fuel rod 30, or the surface of a spacer means 50, and is permanently affixed thereto, for example, by brazing. Fin contact between adjacent fuel rods is arranged to effect a six-point lateral support of the fuel rods at common transverse planes, throughout the inner lattice course positions of the assembly 20. The fins provide means for precisely spacing the fuel rods.

Each fin 40 is formed with sufficient length and angle to impart a transverse flow component to a portion of the generally longitudinal flow through the minimum fuel element clearance between two adjacent flow channels 60. The spacing between each series of the axially spaced fins is selected so that an adequate transverse flow component will be maintained through the minimum clearances (between adjacent fuel rods) in the axial intervals between the series of fins, and also so as to assure that the overall fuel element assembly will contain a sufficient number of rigid support points in order to provide adequately precise spacing between the fuel rods and a desired level structural integrity within the fuel element assembly generally not attainable with typical contemporary types of fuel rod spacers.

Fuel element assemblies, in accordance with the invention, consist essentially of a multiplicity of finned fuel rods arrayed in a triangular pattern having a pitch to fuel rod diameter ratio which will yield the fuel to water volume ratio or water volume fraction of a tight lattice. In the embodiment illustrated in FIG. 1, the fuel rods 30 may be differentiated by the number and circumferential spacing of the longitudinal fins in each axial series. Thus, the central fuel element 30F is formed with series of three longitudinal fins 40 located at circumferentially and longitudinally spaced intervals as is best shown in FIGS. 6 and 7. The fins 40 of the central fuel rod 30F are circumferentially spaced at equal 120-degree intervals about the circumference of the cylindrical cladding. A point on the periphery of each fin 40 of fuel rod 30F contacts and is joined to the cladding of the adjacent fuel rods 30A. As shown in FIGS. 8 and 9, the fuel rods 30A have a plurality of single axially spaced fins. Points on the periphery of fins of the adjacent fuel rods 30E similarly contact and are joined to the cylindrical cladding of the central fuel rod 30F within the region between the fins of the central fuel rod 30F to thereby effect a six-point lateral support in a common transverse plane. The fuel rods 30E include axially spaced series of five fins. The fins 40 in each axial series of a fuel rod 30E are equally spaced from each other over a 300-degree portion of the cylindrical cladding as is illustrated in FIGS. 10 and 11. The first concentric course of lattice rod positions about the central fuel rod 30F is thus defined by an alternating sequence of fuel rods 30A and 30E. Similarly, a second concentric course is defined by an alternating sequence of three fuel rods 30A-30C-30E. As shown in FIGS. 12 and 13, fuel rod 30C is provided with series of three equally spaced fins over a 180-degree portion of the surface of the cylindrical cladding. The outer course in the embodiment of FIG. 1 includes pairs of adjacent rods 30C or 30B alternately spaced by an assembly spacer means 50 and a fuel rod 30D. The fuel rods 30B are illustrated in FIGS. 14 and 15; and, the fuel rods 30D are shown in FIGS. 16 and 17. Fuel elements assemblies having a greater number of concentric courses may be constructed in accordance with the preferred illustrated embodiment as is noted in Table I. Table I lists the number and location of each type of fuel rod 30 in a fuel element assembly having N concentric courses disposed about a central fuel rod 30F.

TABLE I

| Fuel Rod | No. Rods | Location |
|---|---|---|
| 30A | 3 (N − 1) | At rod locations on diagonal center-lines between center rod 30F and spacer bars. |
| 30B | 3 (N − 1) | At rod location on peripheral rows between spacer means 50 and corner rod 30D where cross-flow component (discussed hereafter) is outward to adjoining fuel assemblies. |
| 30C | 3 (N − 1)$^2$ | At rod location on peripheral rows between spacer means 50 and corner rod 30D where (discussed hereafter) cross-flow component is into fuel assembly from adjoining assemblies. Also, all rods not located on peripheral row or on diagonal center lines. |
| 30D | 3 | At alternate corners not occupied by spacer means 50. |
| 30E | 3 (N − 1) | At rod locations on straight lines between center rod 30F and corner rod 30D. |
| 30F | 1 | At center rod location. |

Fuel elements including axial spaced fin series containing one to five fins are utilized in the embodiment of FIG. 1. Each fin is angularly disposed at an equal angle relative to the longitudinal axis of the fuel element assembly.

FIGS. 4 and 5 illustrate a fuel element with six fins formed integrally with the fuel element cladding. Fuel elements of the type utilized in the preferred embodiment illustrated herein can be fabricated from the arrangement illustrated in FIGS. 4 and 5 by removing unwanted fin material as may be required to produce a desired number of fins and axial spacing. End caps and the internal fuel construction for the fuel elements described herein can be fabricated in accordance with known practices.

It will be observable to those skilled in the art that a triangular-pitch fuel element arrangement such as described may contain a plurality of various combinations of fuel rods having axial series of fins ranging up to six circumferentially spaced fuel pins. In addition, it is also possible to arrange the series of fins within the fuel element assembly so that the central fuel rod has no fins but is laterally supported, as described, by the contact of fins from adjacent fuel rods. The fins of each series in the illustrated embodiment of FIG. 1 spiral in a clockwise manner about the axes of the fuel elements.

The spacer means 50, illustrated in FIG. 1 as solid bars, and located at alternate corners of the periphery course, act as guides to permit insertion or removal of a fuel assembly into or out of a reactor core, and to maintain the lateral spacing between adjacent fuel assemblies. The spacer bars 50 in fuel assemblies at the periphery of the core abut against a mating flat core baffle surface (not shown) which parallels the exposed sides of the hexagonal shaped fuel element assemblies. A clearance is provided between the fuel elements and the core baffle structure to allow circulation of transverse components of the coolant flow between adjacent hexagonal sides of the fuel element assemblies at the core periphery. Fuel assembly end fittings (not shown) can be attached to the spacer bars to provide further structural integrity of the assembly.

Figure 2:
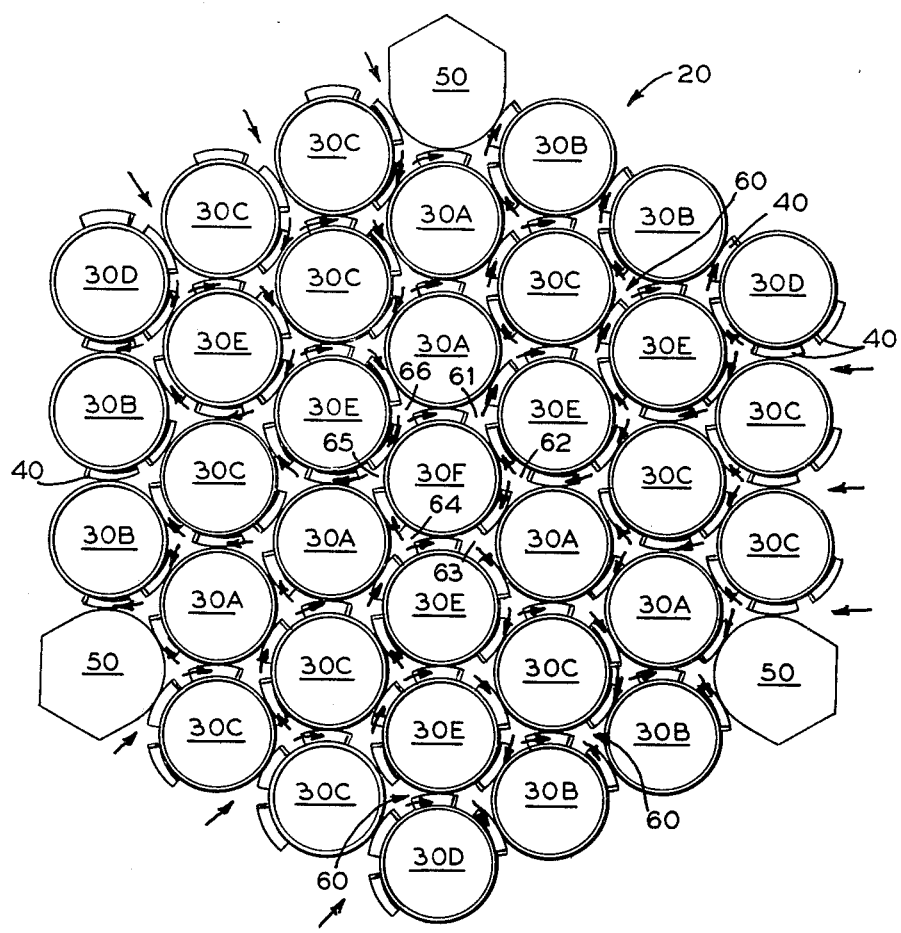
FIG. 2 is a cross-section similar to FIG. 1 schematically illustrating a cross-flow coolant pattern at one level of the reactor.
Figure 3:
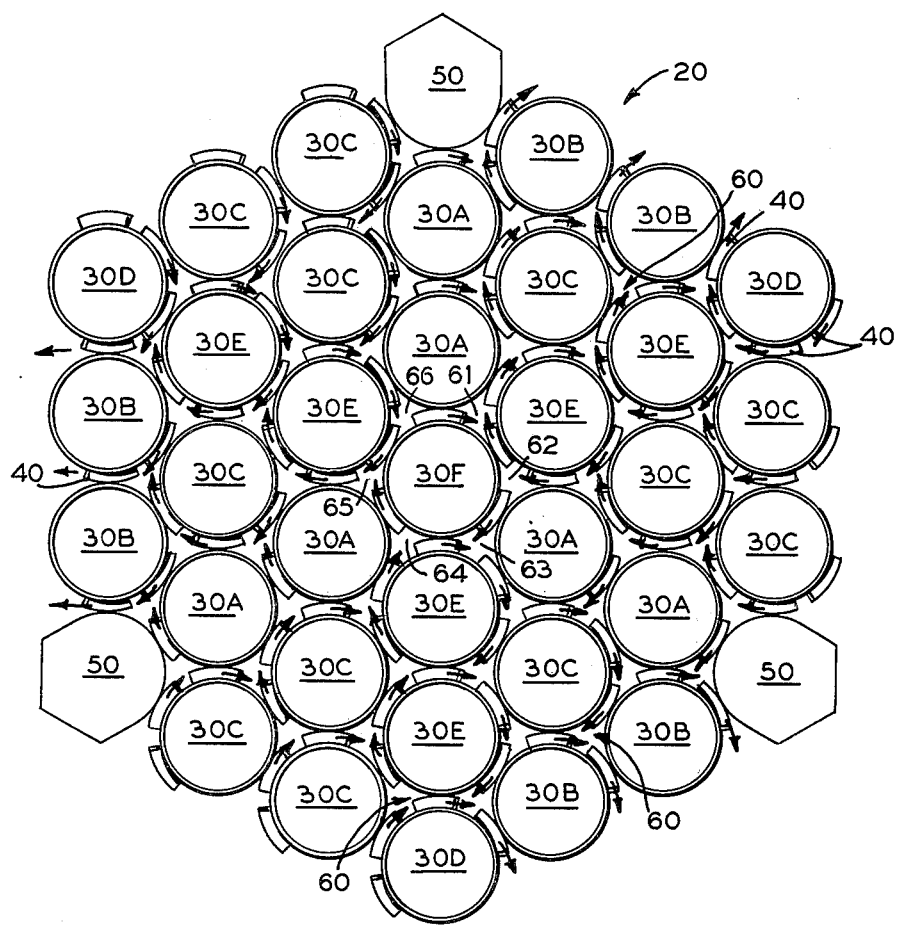
FIG. 3 is a cross-section schematically illustrating a cross-flow pattern of another level of the reactor.

FIGS. 2 and 3 provide a diagrammatic illustration of the transverse flow components (through the illustrated flow arrows) imparted to the generally longitudinal flow by the fins in the arrangement in FIG. 1. In this regard, FIG. 2 illustrates the transverse components at the leading edges of the fins and FIG. 3 illustrates the transverse flow pattern at the trailing edge. For purposes of description and illustration, the generally longitudinal flow is upward when the fuel element assembly is disposed vertically. Thus, the induced transverse flow components follow the upwardly extending clockwise angle of the fins in the embodiment of FIGS. 1–3, and the "leading end" of a fin is the lowermost edge while the "trailing end" of the fin is the uppermost edge. The leading end of a fin therefore diverts flow from the flow channel in which it is disposed, and the trailing end of a fin conveys flow to the flow channel in which it is disposed. A number of representative flow channels, designated by reference numerals 61–66, about the central fuel element in FIGS. 2 and 3 facilitate a further description. Referring now to FIG. 2, the transverse flow components in adjacent channels at the leading fin end of a series of fins, in a common transverse plane, are shown alternately diverted by a single fin (at channels 61, 63, 65) and double fins (at channels 62, 64, 66) from adjacent flow channels. As shown in FIG. 3, flow is alternately conveyed to the flow channels by one (at channels 62, 64, 66) or two (at channels 61, 63, 65) trailing fin ends. Moreover, in a given flow channel the number of flow streams diverted or converged, at the leading or trailing ends respectively, also alternates. Hence, a single transverse flow stream is diverted from the channel 61 at the leading end of the fins while two flow streams are conveyed to the flow channel 61 at the trailing end of the fins. Inducement of the transverse flow components between adjacent channels through the region of minimum spacing between the fuel rods promotes the transfer of heat and reduces coolant and cladding temperature, in the regions of these close clearances, thereby diminishing the possibility of excessive clad temperature and providing more uniform temperatures across the core at any given elevation.

FIGS. 18 and 19 respectively illustrate the side and end views of a series of fuel elements, having different number of fins, joined in accordance with the invention.

Table II sets forth the details of a reactor core utilizing fuel element assemblies in accordance with the invention which could be adapted for retrofit within a typical current light water reactor design.

TABLE II

| | |
|---|---|
| Core Diameter, feet(meters) | 9.9(3.00) |
| Core Height, feet(meters) | 4.1(1.25) |
| Volume Fraction of Water, H$_2$O | 0.27 |
| Volume Ratio, Fuel/Water | 2.2 |
| PuO$_2$ + UO$_2$ loading initial, kg | 44,000 |
| Fissile Plutonium, kg | 3100 |
| Specific power, MWe/MT | 20.8 |
| Maximum fuel-element power, KW/ft(Kw/m) | 15 (49.20) |
| Average fuel-element power, W/ft (w/m) | 5.5(18.10) |

TABLE II-continued

| | |
|---|---|
| Lattice pitch, in(cm) | 0.356(0.910) |
| Fuel element diameter, in(cm) | 0.32 (0.810) |
| Cladding thickness, in(cm) | 0.015(0.038) |
| Maximum core pressure drop, psi(kPa) | 50 (345) |
| Fuel burnup, MWd/MT | 72,000 |
| Conversion ratio | 1.08 |

Thus, a number of salient features characterize the invention. The fuel elements are arrayed on a triangular pitch. All of the fuel elements are joined at points lying in common transverse planes intersecting the fuel elements axes. The trailing end of a fin conveys flow to the flow channel in which the trailing end is disposed. The leading end of a fin diverts flow from the flow channel in which the leading end is disposed. Each series of the axially spaced fins on the fuel elements extends between common transverse planes. At the plane of the leading end of a series of fins on a fuel element, flow is alternately diverted from adjacent flow channels about the fuel element, that is, by two fins or by a single fin. Similarly, at the plane of the trailing end of a series of fins on a fuel element, flow is alternately conveyed into adjacent channels, that is, by two fins or by one fin. A channel having a dual stream diversion at the leading fin end plane has a single stream convergence at the trailing fin end plane, and vice versa. Transverse components of the coolant, moreover, traverse all regions of minimum clearance between adjacent fuel elements. Finally, transverse flow components are established into and out of the fuel element assembly to promote a measure of transverse circulation between adjacent assemblies in a reactor core thereby reducing variations in coolant temperature throughout the core.

As used in the specification and claims, the term "tight lattice" shall be understood as defining an fuel assembly in which either fuel to water volume ratio ranges from 2 to 3.2 or having a water volume fraction (relative to the volume of the assembly) ranging from 0.2 to 0.3 or both.

I claim:

1. A tight lattice fuel element assembly for a pressurized-water cooled nuclear converter reactor comprising: a multiplicity of fuel rods disposed in a spaced parallel array having an equilateral triangular pitch for all of said fuel rods and longitudinal coolant channels between multiple adjacent fuel rods for a generally longitudinal coolant flow, one or more longitudinal fins formed on at least some of said fuel rods disposed serially at equally spaced common axial intervals, said fins having an equal angular orientation relative to the longitudinal axis of the fuel rods, each of said fins extending over a portion of the circumference of the fuel rods and between adjacent coolant channels, each of said fins spirally rotating in the same direction, each of said fins having a peripheral point in contact with and joined to an outer cylindrical portion of an adjacent fuel rod, and said points in each axially spaced series lying in substantially the same transverse plane whereby a transverse flow component part of the longitudinal coolant flow is established throughout the fuel element assembly.

2. The tight lattice fuel element assembly as defined in claim 1 wherein each of said fins includes a leading edge in a channel and a trailing edge in an adjacent channel, and the leading edge of two fins are disposed in every other channel adjacent to a channel in which the leading edge of a single fin is disposed so as to alternately divert flow stream components of unequal magnitude.

3. The tight lattice fuel element assembly as defined in claim 1 or 2 wherein a first fuel rod is contacted by the fins or adjacent fuel rods and each fin of the first fuel rod similarly contacts adjacent fuel rods so as to establish a six-point lateral support of said first fuel rod.

4. The tight lattice fuel element assembly as defined in claim 1 or 2 wherein the array of said fuel element assembly has a hexagonal cross section and includes a central fuel rod having a series of three of the fins, a fuel rod having a series of five of the fins disposed at each fuel rod location lying on alternate lines between said central fuel rod and a corner location of the hexagonal array, a fuel rod having one said fin at axially spaced intervals disposed at each fuel rod location lying on alternate adjacent lines between said central fuel rod and a corner location of the hexagonal array, a fuel rod having a series of four fins disposed at least at every other corner location of said hexagonal array, a fuel rod having a series of two of the fins disposed at fuel rod locations on at least some of the sides of a peripheral row of said array intermediate said corner locations, and a fuel rod having a series of three of the fins disposed at every fuel rod location in said fuel element assembly not occupied by the aforesaid fuel rods.

* * * * *